Oct. 4, 1960     D. B. COX     2,955,185

CONSTANT TEMPERATURE APPARATUS

Filed Dec. 16, 1957     2 Sheets-Sheet 1

INVENTOR.
DUNCAN B. COX
BY
his ATTORNEYS.

Oct. 4, 1960  D. B. COX  2,955,185
CONSTANT TEMPERATURE APPARATUS
Filed Dec. 16, 1957  2 Sheets-Sheet 2
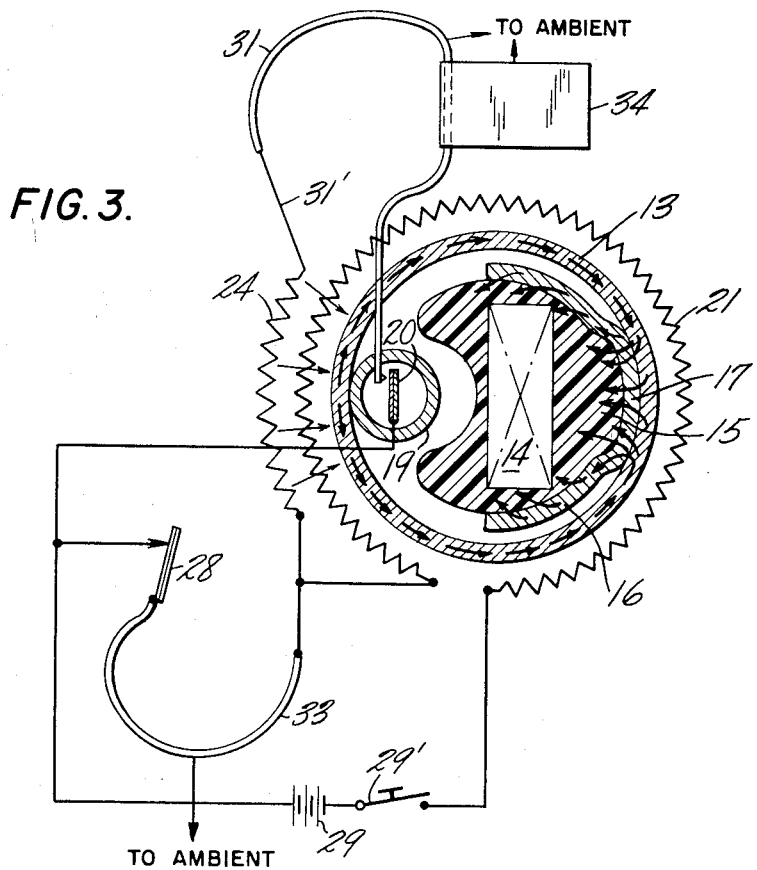
FIG. 3.
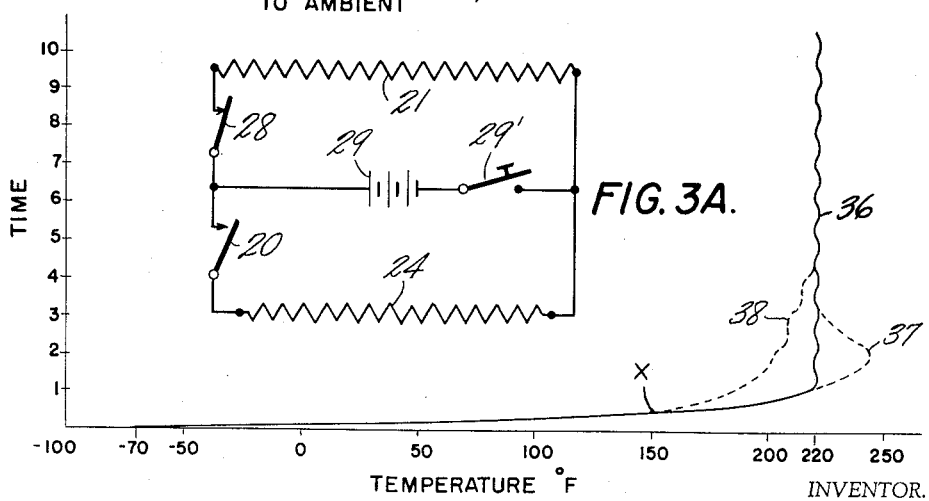
FIG. 3A.
FIG. 4.
INVENTOR.
DUNCAN B. COX
BY
ATTORNEYS.

United States Patent Office 2,955,185
Patented Oct. 4, 1960

2,955,185
CONSTANT TEMPERATURE APPARATUS
Duncan B. Cox, Oyster Bay, N.Y.
Filed Dec. 16, 1957, Ser. No. 702,897
15 Claims. (Cl. 219—19)

This invention relates to a constant temperature apparatus, and has particular reference to apparatus for rapidly raising and then maintaining constant the temperature of devices which function most effectively or efficiently at a predetermined temperature.

With the increasing range and use of aerial and submarine projectiles and vehicles subjected to a very wide range of ambient temperature fluctuation, the problem has increased of providing and maintaining the most effective and efficient operating condition for their critical regulating and control devices, such as transistors, diodes, piezo-crystals, resistors, condensers or any other device whose operating effectiveness depends upon a predetermined uniform temperature.

In accordance with the invention, the device whose temperature is to be controlled is heated electrically up to predetermined temperature and maintained at that temperature in an oven by two electrical resistance heaters controlled by two thermostatic elements, each of which performs a different function and each of which is so constructed and arranged as to compensate for the effect on the oven heat of fluctuations in ambient temperature to which the oven is subjected in use, so as to quickly attain and precisely maintain the predetermined best operating temperature of the device under all operating conditions.

More particularly, one of the heaters is the warm-up heater and is controlled by a thermostatic timer, and the other heater is a maintenance heater controlled by a control thermostat for holding the predetermined temperature of the device whose temperature is to be controlled after the warm-up heater is shut off. The thermostatic timer is partially thermally insulated from the device whose temperature is to be controlled, and is provided with a controlled heat path to the outside container of the oven in such a way that its response is modified by changes in ambient temperature. In this way the delay period of the timer is made to be longer at a low ambient temperature and shorter at a high ambient temperature than if the timer were installed so as to be directly affected by the temperature of the device whose temperature is to be controlled.

The control or maintenance thermostat, in turn, is compensated for fluctuations in ambient temperature so it controls the temperature in its immediate vicinity at a level which varies inversely with the ambient temperature. In so doing it causes the device to be maintained at constant temperature, although the device is so installed that its temperature is always less than the temperature in the immediate vicinity of the control thermostat by an amount which varies directly with the ambient temperature. Furthermore, the control or maintenance thermostat is so installed that it functions cleanly on opening and closing its contacts, without destructive arcing.

It will be seen that my invention provides an extremely compact and accurate temperature control apparatus for devices requiring rapid temperature rise to, and control at, a predetermined temperature for an indefinite period of time, and also one which does so under most severe ambient conditions without being adversely affected thereby, so that the devices whose temperatures are to be controlled operate under the most favorable conditions at all times, immune to external influences.

For a more complete understanding of the invention, reference may be had to the accompanying drawings, in which Figure 1 is an axial section through the constant temperature apparatus of this invention, as seen along the line 1—1 of Fig. 2;

Fig. 3 is a semi-schematic diagram of the apparatus showing the electrical circuitry of the apparatus;

Fig. 3A is an alternative electrical circuit diagram; and

Fig. 4 is a typical time and temperature curve showing the control effected by the apparatus of this invention.

Figure 1:
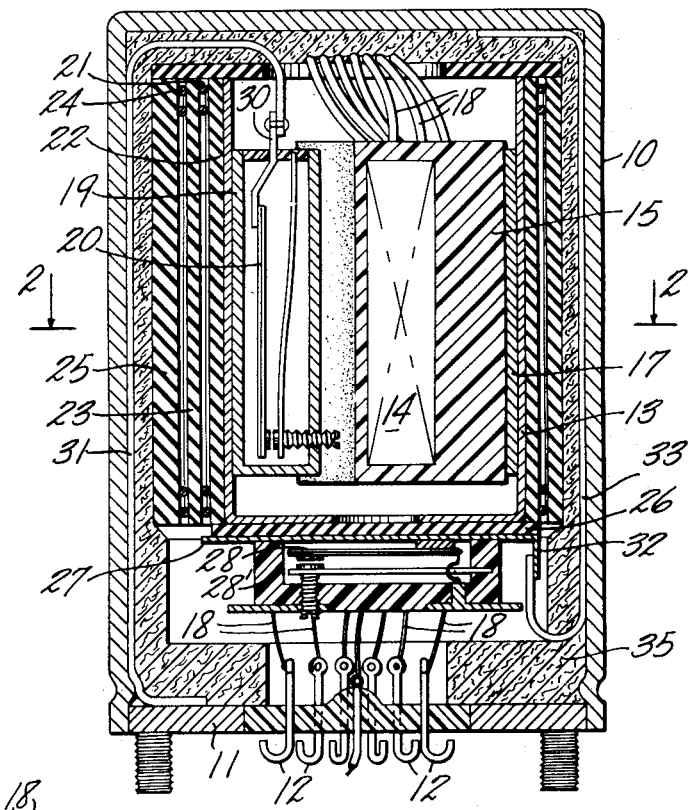

Referring to the drawings, numeral 10 designates the cup-shaped outer housing of the apparatus which may have a polished heat-reflecting outer surface with low heat emissivity. The open end of the housing 10 is sealed by a header 11 through which pass the electrical connectors 12 leading to and from the external circuits forming no part of the present invention.

Mounted within the housing 10 and insulated therefrom by thermal insulation 35, is a thin-walled cup-shaped container 13, preferably formed of aluminum, which is adapted to carry the heating and temperature control system as well as the device or devices whose temperature is to be raised and then maintained constant. The heated device or devices may comprise electrical components such as transistors, diodes, piezo-crystals, resistors, condensers, or combinations thereof, or any other equipment requiring uniform temperature for operating effectiveness or efficiency. Inasmuch as the nature of the temperature-controlled device or devices forms no part of the present invention, it or they will be generally indicated in the drawings by the block 14.

The temperature-controlled block 14 is encased in a casting 15 of suitable plastic material, such as an epoxy resin for example, which has good dielectric properties and is a relatively good conductor of heat. This plastic is cast within, and is made to adhere to, the inner surface of a semi-cylinder 16 made of a metal having high conductivity, preferably aluminum. The semi-cylinder 16 is shorter in axial length than the container 13 and is formed opposite its open side with a wide longitudinal rib or ridge 17 on its outer surface having the curvature of the inner surface of container 13 against which it is secured so as to provide good heat-conducting contact. The remainder of the semi-cylinder 16 is out of contact with the container 13. Rib or ridge 17 may be connected to the interior of container 13 by any means which assures good metal-to-metal conductivity between the ridge 17 and the container 13.

The conductors 18 leading to and from the block 14 project from the upper end of the casting 15, and are run down the outside of the container 13, inside the thermal insulation 35. These conductors 18 are electrically connected to the connectors 12 extending through the header 11 as indicated in Fig. 1.

Secured in good heat-conducting contact to the inner surface of container 13 and opposite the point where the rib or ridge 17 engages the same is the tubular casing 19 of brass or copper for the control thermostat 20, which is shown in the drawings by way of example as a simple bimetal strip adapted to flex in response to temperature changes and serves as a switch to make or break electrical contact with an adjustable electrical contact spring spaced from the bimetal strip so as to be engaged thereby at a predetermined temperature. It will be observed in Fig. 2 that the resin casting 15 may be closely shaped around the casing 19 of control thermostat 20 but is not in contact therewith.

The warm-up electrical resistance type heater 21 encircles all or the major part of the container 13 and preferably is wound of pure nickel wire over a wrapping of electrical insulation 22 in any suitable way such as in non-inductive axial zig-zag fashion.

The maintenance heater 24, which may also be wound in axial zig-zag fashion, is placed on the opposite side of container 13 from the area of contact between ridge 17 and container 13. In the configuration shown, warm-up heater 21 encircles container 13 completely, and maintenance heater 24 lies over warm-up heater 21, and covers about 60° of the circumference. Electrical insulation 22 separates the warm-up heater 21 from container 13, electrical insulation 23 separates the maintenance heater 24 from warm-up heater 21, and electrical insulation 25 serves as an outer wrapping for both heaters.

Cemented to the lower end of container 13 as seen in Fig. 1 is a disc 26 of low heat-conducting material, such as a thermosetting plastic of the class including phenolic, and epoxy resins, of the order of ⅛ inch thick or less. Cemented on the plastic disc 26 is a thin disc 27 of good heat-conducting material such as copper. Mounted on copper disc 27 in such a way that it is responsive to the temperature of the copper disc 27 is thermostatic timer 28, which may be of the bimetallic strip type, as shown in Figs. 1 and 3, or of the concave snap disc type, it being understood that the particular type is not part of the present invention. The thermostatic timer 28, enclosed in a housing 28', is normally closed and opens on temperature rise. Its temperature response may be adjustable to suit requirements by adjusting the position of the contact spring, or otherwise.

As is shown in Fig. 3, the thermostat 20 is preferably connected in series with both the main or warm-up heater 21 and the maintenance or auxiliary heater 24, and the thermostatic timer 28 is connected in parallel with the maintenance heater 24 and the control thermostat 20. The heaters 21 and 24 are energized from a suitable source, schematically shown as the battery 29 controlled by switch 29'. Alternatively, the thermostatic timer 28 and the thermostat 20 can be connected to directly control the heaters 21 and 24 respectively, as shown in Figure 3a. However, the preferred wiring arrangement makes it impossible for both heaters to operate at the same time, and this permits the maintenance heater 24 to be installed on top of the warm-up heater 21 without the possibility of excessive temperature because of simultaneous operation.

Interposed between the control thermostat 20 and the maintenance heater 24 by being directly connected to the terminal 30, which is fastened to the bimetal strip, is a relatively heavy wire 31 of good heat-conducting material such as copper, which lies in heat-conducting contact with the interior surface of the external housing 10, although it is electrically insulated therefrom. Similarly, the copper disc 27 on which thermostatic timer 28 is mounted in good heat-conducting relation, is connected at 32 to a relatively heavy electrically insulated wire 33 of good heat-conducting material such as copper, which lies in heat-conducting contact with the interior surface of the external housing 10 and may be connected directly to the header 11 to further increase its heat relation to the external housing.

If desired, separate thermal conducting wires or strips may be in thermal contact with housing 10, and connected to 30 and 32, leaving wires 31 and 33 to perform only the electrical conducting function.

Inasmuch as the external housing 10 is directly or indirectly exposed to the ambient atmosphere and thus responds to ambient temperature changes, such changes are communicated to a predetermined degree through the wires 31 and 33 in thermal contact therewith and to the corresponding thermostatic devices 20 and 28. Since the size and length of the wires 31 and 33 and also the area of surface contact of the wires 31 and 33 with the external housing 10 determine the extent to which the ambient temperature affects the thermostat 20 and the timer 28, the wires 31 and 33 may be adapted to transmit temperature changes as may be required. Also, the effective contact area of wires 31 and 33 with housing 10 may be augmented without substantially increasing their lengths by cementing thereto a pressure-sensitive metal foil strip 34 shown in Fig. 3, which is arranged so as to lie flatwise against the interior surface of external housing 10, and to surround the wire.

In order to prevent the temperature of the heater from affecting the compensation, the size of the wire 31 is reduced to smaller diameter at 31' between the control thermostat 20 and the maintenance heater 24, as shown in Fig. 3, so that wire 31' performs only its electrical function rather than the dual electrical and thermal function of wire 31. For example, wire 31 may be of No. 18 copper and wire 31' may be of No. 30 copper.

Figure 2:
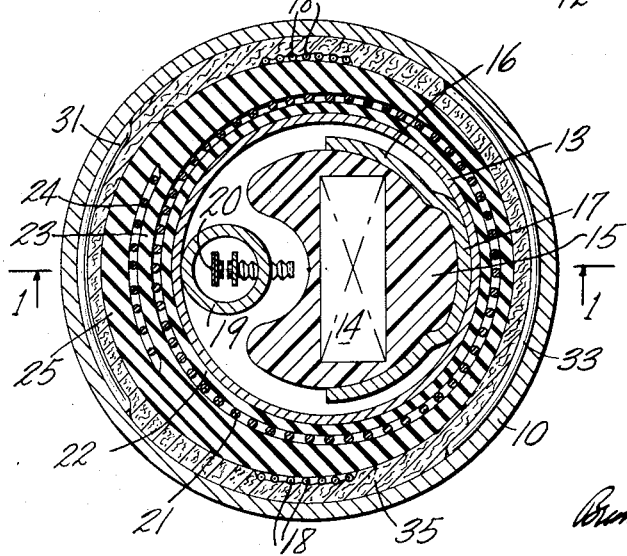
Fig. 2 is a transverse section through the apparatus as seen along the line 2—2 of Fig. 1.

All of the elements and parts 13 to 34, inclusive, are sealed in the external housing 10 and are insulated against shock and also temperature change, except for ambient temperature-responsive parts 31, 33 and 34, by the fibrous packing material 35 shown in Figs. 1 and 2.

In operation of the constant temperature control apparatus of this invention as illustrated by the accompanying drawings, the object is to raise the temperature of the block 14, containing the items whose temperature is to be kept constant, up to their predetermined effective or efficient operating temperature as rapidly as possible and then to maintain that temperature constant. In order to illustrate the operation of the heating and control cycle, reference may be had to a typical time-and-temperature curve illustrated by Fig. 4, wherein the substantially horizontal portion of the curve, beginning at −70° F. shows an extremely rapid rise to 220° F., i.e., within 1.4 minutes, whereafter the temperature was held constant for a test period of over ten minutes at 220° F., the slight fluctuation range of ±1° at 220° being due to on-and-off control of the maintenance heater brought about by the control thermostat 20.

Referring to Figs. 1, 2 and 3, the electrical resistance of warm-up heater 21 is normally relatively low, providing high wattage for rapid warm-up. The resistance of the control or maintenance heater 24 is normally relatively high, resulting in a relatively low wattage which provides smaller cyclic swings and also increases the life of thermostat 20. It will be noted that when these two heaters are operated in series, the output of the high resistance unit is not much reduced by inclusion of the second heater in the circuit, and the output of the warm-up heater becomes very low, being only a small fraction of the output of the maintenance heater. In a typical design the resistances are 55 ohms and 9 ohms respectively for the maintenance heater 24 and the warm-up heater 21. Assuming energization of the apparatus by manual closure of switch 29' and with both thermostatic switches 20 and 28 closed, the maintenance heater 24 is short-circuited by the parallel-connected warm-up thermostat and wire 33, so that full line voltage is applied across the warm-up heater 21 which operates alone to heat the block 14 very rapidly up to the temperature marked "X" on Figure 4, at which point the thermostatic timer 28 opens. At this point the temperature of the block 14 will be about 150° F. in the case exemplified graphically in Fig. 4, but may lie anywhere between about 140 and 190° F. However, even though the warm-up heater 21 has been shut off, and even if the control thermostat 20 is also open, the temperature of block 14 continues to rise rapidly. The amount of this initial shoot depends on the rate of heating and on the ambient temperature. Without compensation, the initial shoot of any given unit will overrun the desired control temperature as shown at 37 under certain conditions, and undershoot the desired control temperature as shown at 38 under other conditions. The point at which the maintenance thermostat opens is of relatively minor importance, because the small wattage it provides can result in only a relatively slow rate of warm-up.

Thermostatic timer 28 is mounted on the end of container 13 and is thermally insulated by packing 35 from the header 11 and the housing 10. The elapsed time after the application of heating power before the contacts of the timer open depends upon the net amount of heat conducted thereto from container 13. The path for this heat flow from container 13 is through the insulating disc 26, which must be accurately selected as to thickness and thermal conductivity, and through the high-conductivity disc 27. The rate at which heat reaches the high-conductivity disc 27 is greatly reduced by the insulating disc 26. The rate of rise in temperature is reduced, and the operation of the thermostatic timer is correspondingly delayed, by the heat loss from the high conductivity disc 27 and from the thermostatic timer. Some heat loss occurs through the thermal insulation 35. An additional path may be provided by use of a thermal bleed from the high conductivity disc or from the timer. In Fig. 1 this is represented by the wire 33 which is attached at 32 to the high conductivity disc 27. Bleed wire 33 is shown in contact with the outer housing 10. Alternatively it may be connected directly to header 11 when greater heat flow is desired. The amount of heat lost through the insulation and along the bleed wire (if used) is a function of ambient temperature. Accordingly, if the ambient temperature is low, the thermostatic timer 28 opens later, and vice versa. Thus the initial shoot from rapid warm-up at low ambient temperature may be held close to the desired control temperature, rather than falling short, as indicated at 38 and as would otherwise occur, the greater heat losses from the container during the period of the initial overshoot being compensated by the thermostatic timer remaining closed until a relatively higher temperature has been reached. I find that when the thermal masses and thermal conductivities of the components described immediately above are properly proportioned, the same unit may be made to avoid not only undershooting as described above when starting from relatively low temperatures, but also overshooting as represented by dotted line 37 when starting from relatively high temperatures.

Changes in initial shoot as the result of changes in the potential of the power source are controlled by the high temperature coefficient of resistance of the nickel wire used for the warm-up heater 21 and by the relationship of the mass and specific heat of the heater and the container 13 on which it is mounted, as compared to the mass and specific heat of the block 14 and casting 15, and also the mass and specific heat of the thermostatic timer 28. Thus when the voltage is high, say 30 volts, the nickel wire heater 21 tends to get much hotter during warming up than when the voltage is low, say 24 volts. As the temperature of heater 21 rises with voltage increase the resistance of the nickel wire rises and thus automatically reduces the heating power. This correction partly precludes a serious overshoot such as 37 at high voltage and also a correspondingly serious undershoot such as 38 at low voltage. Further correction is effected by the relationship of the masses and thermal capacities. During high voltage heating the difference in temperature between the heater 21 and container 13 on the one hand and the block 14 and casting 15 on the other is greater than it is during low voltage heating. This greater difference would result in an overshoot if the warm-up heater 21 were turned off at a fixed temperature. However, the thermostatic timer 28 corrects for this condition in that the higher heat of container 13 raises the temperature of the thermostatic timer more rapidly than it raises the temperature of the block because the timer and its associated components are relatively low in mass and heat capacity as compared to the block. Thus, for successively higher voltages the thermostatic timer 28 will cut off progressively sooner and at progressively lower temperatures of the block 14, so that the initial shoot of the block remains essentially the same despite the large change in heater power resulting from a change of potential such as from 24 to 30 volts, and is compensated for ambient changes as heretofore described without being materially affected by changes in power potential.

The use of nickel wire for warm-up heater 21 has another important advantage in that for any given warm-up rate it provides a lower rate of temperature change at the time when the thermostatic timer 28 operates to open the warm-up heater circuit. Thus, if the initial power of the warm-up heater at —70° F. is 90 watts, for example, the power will have fallen to about 45 watts by the time the warm-up circuit is opened by thermostatic timer 28. This reduced power results in a lower rate of change and thus improves the apparent accuracy of the thermostatic timer 28 in controlling the initial shoot.

As shown in Figure 2, the maintenance heater 24 is in good thermal connection with container 13, being separated from it only by electrical insulation wrappings 22 and 23. The container, in turn, is in good thermal contact with the case 19 of the control thermostat 20. Because heater 24, the adjacent part of container 13, and casing 19, all together have relatively small thermal mass and are isolated from the relatively large thermal mass of block 14 and casting 15, they heat up rapidly, and will cycle through a range of 10° F. or more, even though the control thermostat 20 may have a differential of only 2° F. when tested by itself. This relationship of relatively small thermostat differential coupled with relatively large cyclical temperature variation in adjacent material is possible because of the isolated position of the bimetal strip of thermostat 20 within case 19 and the correspondingly delayed response of the thermostat 20. Because the temperature rapidly overruns the control points, the contacts of the control thermostat 20 open and close sharply, avoiding the faulty performance with occasional prolonged arcing and damage to the contacts which can occur when the contacts are not positively opened and closed.

As shown by the arrows in Fig. 3, there is a long thermal path through the wall of container 13 to rib 17 between the source 24 of heat and case 19 of control thermostat 20 on the one hand and block 14 on the other hand, so that the relatively large fluctuations in temperature in the vicinity of thermostat 20 are almost entirely damped out by the time they reach the block 14, which accordingly has a cyclical variation of only about ±1° F. Heat loss from all areas of the container 13 not covered by the maintenance heater 24, as well as heat losses through the ends of the container from the block 14 and other contents of the container must be made up by heat flowing through the wall of the container as described immediately above. Consequently there is a temperature gradient, and the amount of this gradient varies with ambient temperature. Thus at —70° F. ambient, the block 14 may average 20° cooler than case 19 of control thermostat 20, whereas at 200° F. there is little difference between them. Inasmuch as thermostat 20 holds essentially a fixed control temperature, this difference would result in a progressively lower temperature of the block 14 for successively colder ambient temperatures, unless compensated. Such compensation is afforded by the relatively heavy gage lead wire 31 which connects to terminal 30 of control thermostat 20 and lies in thermal contact with the external housing 10 so as to bleed heat thereto from the thermostat. Thermostat 20 remains closed and heater 24 remains operative until case 19 is sufficiently above the control temperature (i.e., temperature at which the thermostat contacts will open) to bring the bimetal element up to its control temperature in spite of the heat loss through bleed wire 31. At progressively colder ambient temperatures there is progressively greater heat loss from thermostat 20 along bleed wire 31. When bleed wire 31 is properly proportioned and positioned (with or without foil strip 34, as may be appropriate), for progressively lower ambient temperatures, heater 24, casing 19 and the part of container 13 in that vicinity become hotter to the degree required, and the temperature of the block 14 remains essentially constant regardless of ambient temperature changes.

Although a preferred embodiment of the invention has been illustrated and described herein, it is to be understood that the invention is not limited thereby, but is susceptible to changes ni form and detail within the scope of the appended claims.

I claim:

1. In a constant temperature apparatus for a heated unit, the combination of a container, an electrical resistance warm-up heater for rapidly heating the unit, an auxiliary electrical resistance heater for maintaining the temperature of the unit, said heaters being mounted in juxtaposition on said container, an electrical source connected to said heaters for energizing the same, a thermostatic switch responsive to the temperature of said unit for controlling one of said heaters, and a second thermostatic switch interposed in the connection between said source and said warm-up heater and responsive to a predetermined temperature externally of said unit for controlling said heaters, said thermostatic switches being carried by the container.

2. In a constant temperature apparatus for a heated unit, the combination of a container, an electrical resistance warm-up heater for heating the unit, an auxiliary electrical resistance heater for maintaining the temperature of the unit, said heaters being mounted in juxtaposition on said container, an electrical source connected to said heaters for energizing the same, a thermostatic switch responsive to a predetermined temperature externally of said unit and interposed between said source and said warm-up heater, and a second thermostatic switch responsive to the temperature of said unit and said auxiliary heater, said thermostatic switches being carried by the container.

3. In a constant temperature apparatus for a heated unit, the combination of a container for the unit, an electrical resistance warm-up heater encircling said container for heating the unit therein, an auxiliary electrical resistance heater overlying said warm-up heater and having a circumferential width less than that of said warm-up heater, an electrical source connnected to said heaters for energizing the same, a thermostatic switch carried by the container and responsive to the temperature of said unit for controlling said warm-up heater and responsive to a predetermined temperature, and a second thermostatic switch carried by the container at a point adjacent said auxiliary heater and responsive to a predetermined temperature externally of said unit for controlling said auxiliary heater.

4. In a constant temperature apparatus for a heated unit, the combination of a cylindrical container for the unit, an electrical resistance warm-up heater encircling said container for heating the unit therein, an auxiliary electrical resistance heater overlying said warm-up heater and having a circumferential width less than that of said warm-up heater, an electrical source connected to said heaters for energizing the same, a thermostatic switch carried by the container and responsive to the temperature of said unit for controlling said warm-up heater and responsive to a predetermined temperature, a second thermostatic switch carried by the container at a point adjacent said auxiliary heater and responsive to a predetermined temperature externally of said unit for controlling said auxiliary heater, and thermal conducting means interposed between said unit and said container at a point spaced from said second thermostatic switch.

5. In a constant temperature apparatus for a heated unit, the combination of a container for the unit, an electrical resistance warm-up heater encircling said container for heating the unit therein, an auxiliary electrical resistance heater overlying said warm-up heater and having a circumferential width less than that of said warm-up heater and connected in series therewith, an electrical source connected to said heaters for energizing the same, a thermostatic switch carried by the container and responsive to the temperature externally of said unit for controlling one of said heaters, and a second thermostatic switch carried by the container and responsive to a predetermined temperature of said unit for controlling the other of said heaters.

6. In a constant temperature apparatus for a heated unit, the combination of a container for the unit, an electrical resistance warm-up heater encircling said container for heating the unit therein, an auxiliary electrical resistance heater overlying said container and having a circumferential width less than that of said warm-up heater and connected in series therewith, an electrical source connected to said heaters for energizing the same, a first thermostatic switch carried by the container and responsive to a predetermined temperature externally of said unit for controlling one of said heaters, and a second thermostatic switch connected in parallel with said first thermostatic switch and said one heater and carried by the container and responsive to a predetermined temperature of said unit for controlling the other of said heaters.

7. In a constant temperature apparatus for a heated unit, the combination of a container of thermally conducting material enclosing the unit, an electrical resistance heater mounted on and encircling the container for heating the unit therein, a second electrical resistance heater mounted on said container and having a circumferential width less than that of said first-named heater, an electrical source connected to said heaters for energizing the same, a thermostatic switch mounted on one side of said container and interposed between said source and said heaters for controlling the latter, and a thermally-conducting connection between said unit and said container at a point opposite said thermostatic switch for regulating the response of said thermostatic switch to temperature changes of said unit conducted through the material of said container.

8. In a constant temperature apparatus for a heated unit, the combination of a container for the unit, an electrical resistance heater mounted on the container for heating the unit therein, an electrical source connected to said heater for energizing the same, a thermostatic switch mounted on one side of said container and interposed between said source and said heater for controlling the latter, a mass of thermal insulation interposed between said container and said thermostatic switch for regulating the response of said thermostatic switch, and a layer of good heat-conducting material interposed between said mass and said container at a point opposite said thermostatic switch.

9. In a constant temperature apparatus for a heated unit subject to an external source of ambient temperature changes, the combination of a container for the unit, an electrical resistance heater mounted on the container for heating the unit therein, an electrical source connected to said heater for energizing the same, a thermostatic switch mounted on one side of said container and interposed between said source and said heater for controlling the latter, a mass of thermal insulation interposed between said container and said thermostatic switch for regulating the response of said thermostatic switch, and a layer of good heat-conducting material interposed between said mass at a point opposite said switch and said thermostatic switch and connected through the wall of said container to said external source of ambient temperature changes for further regulating the response of said thermostatic switch to temperature changes of said unit.

10. In a constant temperature apparatus for a heated unit, the combination of a container for the unit, an electrical resistance warm-up heater encircling said container for heating the unit, an auxiliary electrical resistance heater for heating said unit and having a circumferential width less than that of said warm-up heater, an electrical source connected to said heaters for energizing the same, a thermostatic switch carried by the container and responsive to the temperature externally of said unit for controlling one of said heaters, a second thermostatic switch carried by the container and responsive to a predetermined temperature of said unit for controlling the other of said heaters, a housing for said container, heaters and thermostatic switches subject to an external source of ambient temperature changes, and a heat-conducting connection between said housing and one of said thermostatic switches for regulating the response of said one thermostatic switch.

11. In a constant temperature apparatus for a heated unit, the combination of a container for the unit, an electrical resistance warm-up heater encircling said container for heating the unit, an auxiliary electrical resistance heater for heating said unit and having a circumferential width less than that of said warm-up heater, an electrical source connected to said heaters for energizing the same, a thermostatic switch carried by the container and responsive to the temperature externally of said unit for controlling one of said heaters, a second thermostatic switch carried by the container and responsive to a predetermined temperature of said unit for controlling the other of said heaters, a housing for said container, heaters and thermostatic switches subject to an external source of ambient temperature changes, and heat-conducting connections between said housing and said thermostatic switches for regulating the response of said thermostatic switches.

12. In a constant temperature apparatus for a heated unit, the combination of a container for the unit, an electrical resistance heater mounted on the container for heating the unit therein, a second electrical resistance heater mounted on said container and having a circumferential width less than that of said first-named heater, an electrical source connected to said heaters for energizing the same, a thermostatic switch mounted on said container and interposed between said source and said heaters for controlling the latter, a housing for said container, heater and thermostatic switch subject to an external source of ambient temperature changes, a thermal connection between said housing and said thermostatic switch for regulating the response of said thermostatic switch to external temperature changes of said unit, an element having an external area engaging said housing for increasing the area of thermal connection between said housing and said thermostatic switch and a thermal filter comprising insulation interposed between said element and said container.

13. In a constant temperature apparatus for a heated unit, the combination of a container for the unit, an electrical resistance heater mounted on the container for heating the unit therein, a second electrical resistance heater mounted on said container and having a circumferential width less than that of said first-named heater, an electrical source connected to said heaters for energizing the same, a thermostatic switch mounted on said container and interposed between said source and said heaters for controlling the latter, a housing for said container, heater and thermostatic switch, a thermal connection between said housing and said thermostatic switch for regulating the response of said thermostatic switch, said connection between said heater and said electrical source being a relatively heavy gage electrical conductor, and a conductor of materially lighter gage electrical conductor interposed between said heavy conductor and said thermostatic switch for minimizing the heat conducted from said housing through said electrical conductor to said thermostatic switch.

14. In constant temperature apparatus, the combination of a container for the unit, an electrical resistance heater encircling said container for heating the unit therein and comprising wire having a high temperature coefficient of electrical resistance, a second resistance heater overlying a radial segment of said heater less than the circumference of the latter, an electrical source connected to said heaters for energizing the same, and a thermostatic switch interposed in the connection between each heater and source and responsive to the temperature of said unit for controlling said heaters.

15. In constant temperature apparatus, the combination of an external housing having an opening at one end thereof, a closure for said opening, electrical connectors extending through said closure from within to without the housing, a container within said housing forming an annular space with the latter and having an opening leading to the end of said housing opposite the end thereof having the first-named opening, electrical heating means mounted on said container for heating an electrical unit within said containers, and electrical conductors connected to said heating means and unit and extending through said container opening and reversely along the exterior of said container through said annular space to said electrical connectors.

References Cited in the file of this patent

UNITED STATES PATENTS

| 1,840,114 | Lazich | Jan. 5, 1932 |
| 2,102,783 | Bokovoy | Dec. 21, 1937 |
| 2,106,756 | Obermaier | Feb. 1, 1938 |
| 2,157,703 | Hovgaard et al. | May 9, 1939 |
| 2,438,345 | Miller | Mar. 23, 1948 |
| 2,462,850 | Eaton | Mar. 1, 1949 |
| 2,510,039 | Rudahl | May 30, 1950 |
| 2,747,069 | Miller | May 22, 1956 |
| 2,791,706 | Font | May 7, 1957 |

FOREIGN PATENTS

| 866,391 | Germany | Feb. 9, 1953 |